(12) United States Patent
Godshaw et al.

(10) Patent No.: US 7,562,751 B2
(45) Date of Patent: Jul. 21, 2009

(54) COMPUTER PROTECTION CASE

(75) Inventors: Donald E. Godshaw, Evanston, IL (US); Andrezj M. Redzisz, Wheeling, IL (US)

(73) Assignee: Travel Caddy, Inc., Elk Grove Village, IL (US)

( * ) Notice: Subject to any disclaimer, the term of this patent is extended or adjusted under 35 U.S.C. 154(b) by 585 days.

(21) Appl. No.: 10/928,232

(22) Filed: Aug. 27, 2004

(65) Prior Publication Data
US 2006/0042896 A1  Mar. 2, 2006

(51) Int. Cl.
*A45C 7/00* (2006.01)
*A45C 9/00* (2006.01)

(52) U.S. Cl. .................. 190/107; 190/102; 190/108; 190/901; 206/320

(58) Field of Classification Search .............. 190/1, 190/107, 108, 901, 2, 102; 206/320, 571, 206/577; 383/4
See application file for complete search history.

(56) References Cited

U.S. PATENT DOCUMENTS

| | | | | |
|---|---|---|---|---|
| 473,540 A | * | 4/1892 | Wheeler | 294/138 |
| 841,902 A | * | 1/1907 | Shumard | 190/107 |
| 3,092,223 A | * | 6/1963 | Martin | 190/1 |
| 4,423,834 A | * | 1/1984 | Rush | 224/153 |
| 4,489,815 A | * | 12/1984 | Martinez et al. | 190/1 |
| 4,621,404 A | * | 11/1986 | Browning | 29/463 |
| 5,437,367 A | * | 8/1995 | Martin | 206/320 |
| 5,445,266 A | * | 8/1995 | Prete et al. | 206/320 |
| 5,494,157 A | | 2/1996 | Golenz et al. | |
| 5,555,614 A | * | 9/1996 | Book | 29/401.1 |
| 5,570,780 A | | 11/1996 | Miller | |
| 6,109,443 A | * | 8/2000 | Dercole | 206/581 |
| 6,460,668 B1 | * | 10/2002 | Godshaw et al. | 190/18 A |
| 6,604,618 B1 | | 8/2003 | Godshaw | |
| 6,871,739 B2 | * | 3/2005 | Lopez | 206/320 |
| 2003/0084543 A1 | * | 5/2003 | Sadow | 16/409 |

* cited by examiner

*Primary Examiner*—Sue A Weaver
(74) *Attorney, Agent, or Firm*—Banner & Witcoff, Ltd.

(57) ABSTRACT

The laptop computer case includes a storage case section having a recessed portion which enables positioning of the storage case over a telescoping handle assembly incorporated in luggage. One side of the storage case section includes multiple panel sections which may be folded to form a pocket to retain an item such as a laptop computer.

9 Claims, 13 Drawing Sheets

COMPUTER PROTECTION CASE

BACKGROUND OF THE INVENTION

In a principal aspect, the present invention relates to a carrying case adapted for packing and/or carrying a personal computer or other item of similar shape, and which accommodates various sizes and configurations of such a personal computer.

In U.S. Pat. No. 6,604,618 B1 entitled Computer Protection and Carrying Case, there is disclosed a soft sided or padded carrying case which may be utilized to accommodate and protect personal computers of various sizes and configurations. The referenced patent is incorporated herewith by reference. Numerous types of carrying cases have been proposed for the protection of personal computers. For example, U.S. Pat. No. 5,570,780 entitled Portable Computer Carrying Case discloses a carrying case which is comprised of rigid body panels. U.S. Pat. No. 5,494,157 discloses a Computer Bag With Side Accessible Padded Compartments. This case is also designed to carry a small computer as well as provide protection of the computer within the described case.

While such prior art constructions have proven to be quite useful, there has remained the need for an improved soft sided or padded carrying case which enables utilization for personal computers of various sizes and configurations and which is also capable of being used in combination with travel bags of various sizes and shapes.

SUMMARY OF THE INVENTION

Briefly, the present invention comprises a computer carrying case which includes a storage case section having a front side, a generally planar, flat back side and a connecting circumferential lateral side. The front side includes a generally central, recessed section to enable positioning of the storage case section over a telescoping handle assembly within an item of luggage. The carrying case further includes multiple panel sections attached to the back side of the storage case section which are foldable to accommodate an item positioned over or on the back side of the storage case section. The various foldable panel sections may thus be folded and then connected or attached to one another by fasteners, such as hook-and-loop fasteners, to hold a personal computer, by way of example, in a storage pocket on the back side of the storage case section. The various foldable panel sections may include rigid or semi-rigid center portions with the remainder portions being flexible to enable folding and accommodation of items such as a laptop computer having various sizes and shapes.

Thus, it is an object of the invention to provide and improve personal computer carrying case.

It is a further object of the invention to provide a personal computer carrying case which maybe incorporated easily in an item of luggage of the type having a telescoping handle assembly positioned along an inside wall thereof.

Yet another object of the invention is to provide a computer carrying case which is useful for the carriage of additional items which might be associated with a computer such as extra batteries, hardwire link-ups and the like.

Another object of the invention is to provide an economical and easy-to-use computer carrying case of the type which enables protection of laptop computers maintained or stored in a formed pocket within the case.

These and other objects, advantages and features of the invention will be set forth in the detailed description which follows.

BRIEF DESCRIPTION OF THE DRAWING

In the detailed description which follows reference will be made to the drawing comprised of the following Figures.

DESCRIPTION OF THE PREFERRED EMBODIMENT

Figure 1:
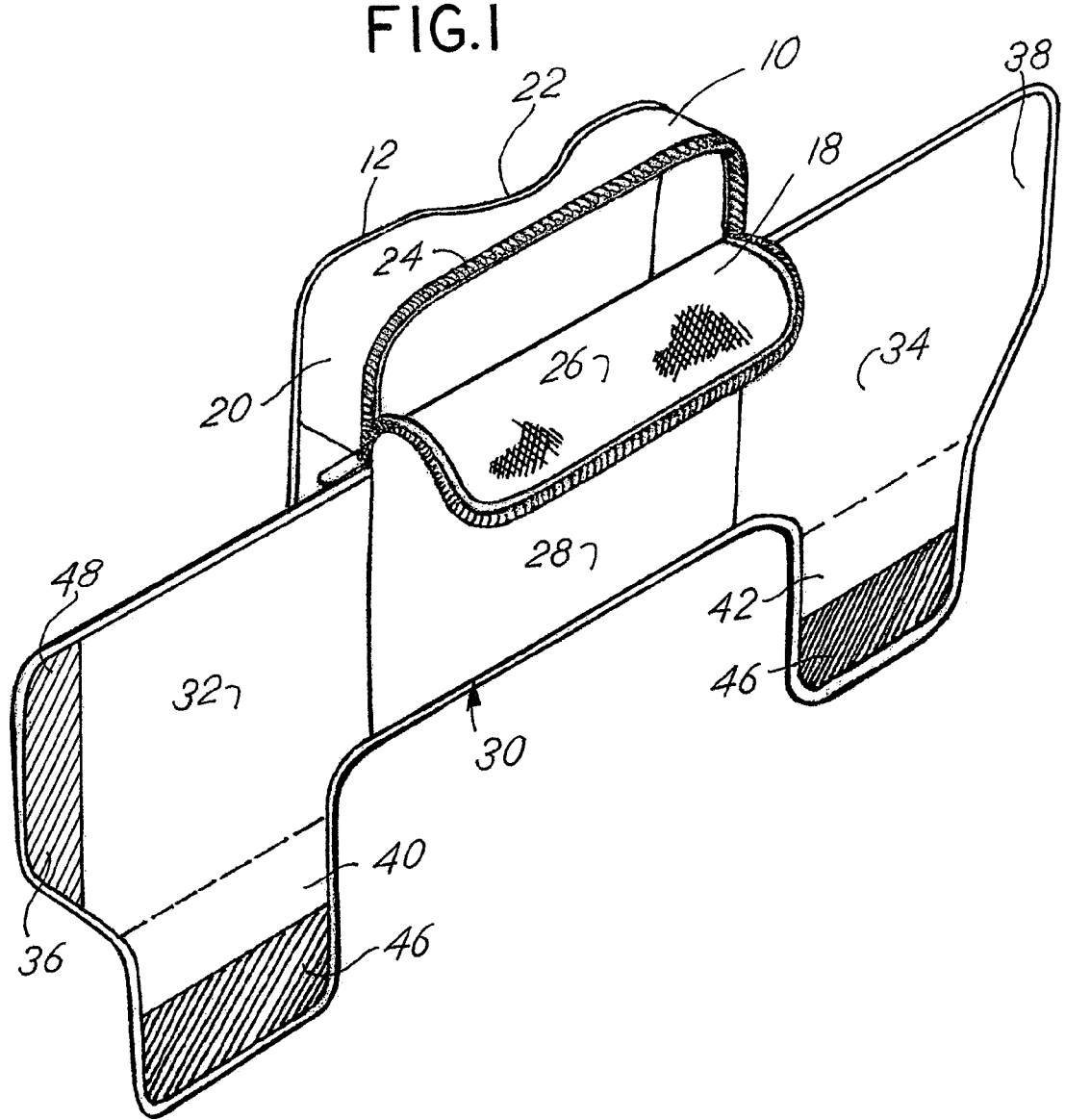
FIG. 1 is an isometric view of the protection case in an open position.

The storage and protection case of the invention is designed principally for storage and carrying of laptop computers. However, various items may be stored and transported using the case of the invention. The invention is therefore not limited to storage and transport of laptop computers.

Referring to the figures, the case comprises a generally rectangular, parallelepiped storage case section 10 which includes a top edge 12 and a bottom edge 14. The top edge 12 is generally parallel to the bottom edge 14. The case section 10 further includes a front side 16 and a back side 18 spaced from the front side 16. A generally circumferential peripheral lateral side 20 completes the case 10 connecting front side 16 and back side 18. The case section 10 is thus a generally rectangular parallelepiped enclosure. However, importantly, the front side 16 includes a generally centrally located recess or trough or depression 22 which connects the top edge 12 to the bottom edge 14. As depicted in the drawings, this recess 22 is sized to fit over an internal, telescoping wheel assembly of a travel bag or travel luggage of the type which typically includes a telescoping handle and wheels.

The back side 18 is affixed, at least in part, by means of a zipper 24 to the lateral side 20. More particularly, the back side 18 includes a flap 26 which is detachable from, or attachable to the lateral edge of the lateral side 20 by means of zipper 24. The portion of the back side 18 that does not define the flap 26 comprises a center section 28 of a larger panel 30.

The panel 30 connects to a first lateral or side section 32 on one side and a second lateral or side section 34 on the opposite side of the center section 28. The center section 28 is preferably a generally rectangular section. The side sections 32 and 34 are also generally rectangular in configuration and include side wings 36 and 38, respectively.

Figure 2:
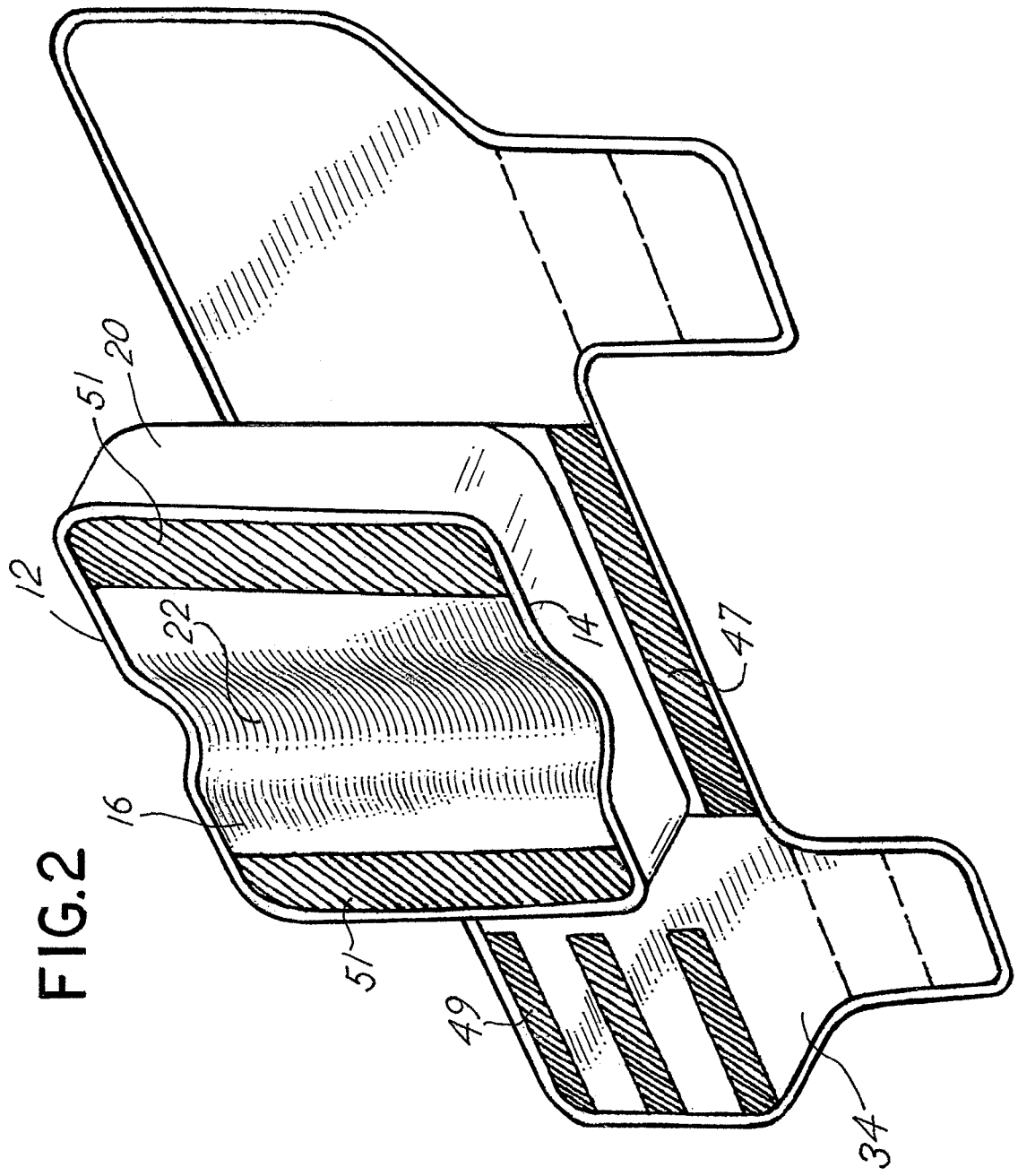
FIG. 2 is an isometric view of the back side of the case of FIG. 1.

The first lateral side section 32 includes a first bottom flap 40. The second lateral side section 34 includes a second bottom flap 42. The first and second bottom flaps 40 and 42 extend downwardly from the respective lateral side sections 32 and 34. Hook and/or loop fastening material 46 is provided on the bottom depending flaps 40 and 42. Similarly, as shown in FIG. 2, hook and/or loop fastening material 47 is provided along the lower edge of the back side 18. Note that such hook and loop material or fastener element may be provided on the outside of lateral side 20 or on the front side 16. The hook and loop fastening material 46, 47 may be either hook or loop fastening material and is designed to cooperate with compatible loop and/or hook fastening material.

Further hook and/or loop fastening material 49 is provided on the back side of the second lateral section or flap 34. Hook and/or loop fastening material 48 is provided on the front side of the first lateral side section 32 again, as depicted in FIG. 1. FIGS. 1 and 2 illustrate that the center section 28 is a generally rigid section, in the preferred embodiment, to provide form and shape to the case construction described. The lateral side panels 32 and 34 are foldable and thus may generally be flexible, although reinforcing material may be included within those panels, or portions of those panels, center portions for example.

Figure 3:
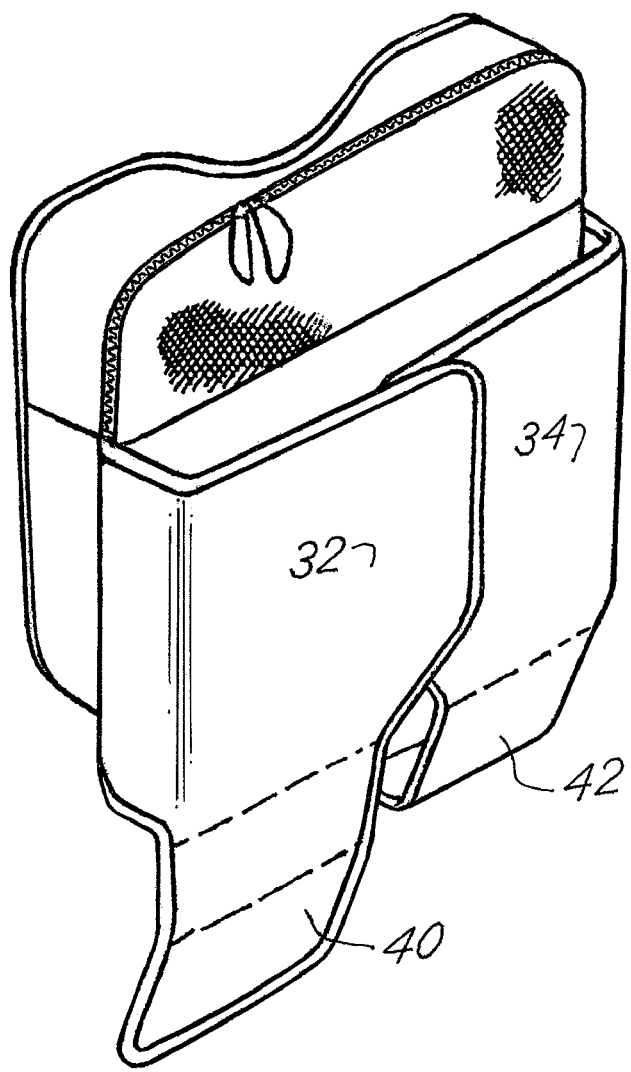
FIG. 3 is an isometric view of the front side of the case of FIG. 1 in a partially folded condition.
Figure 4:
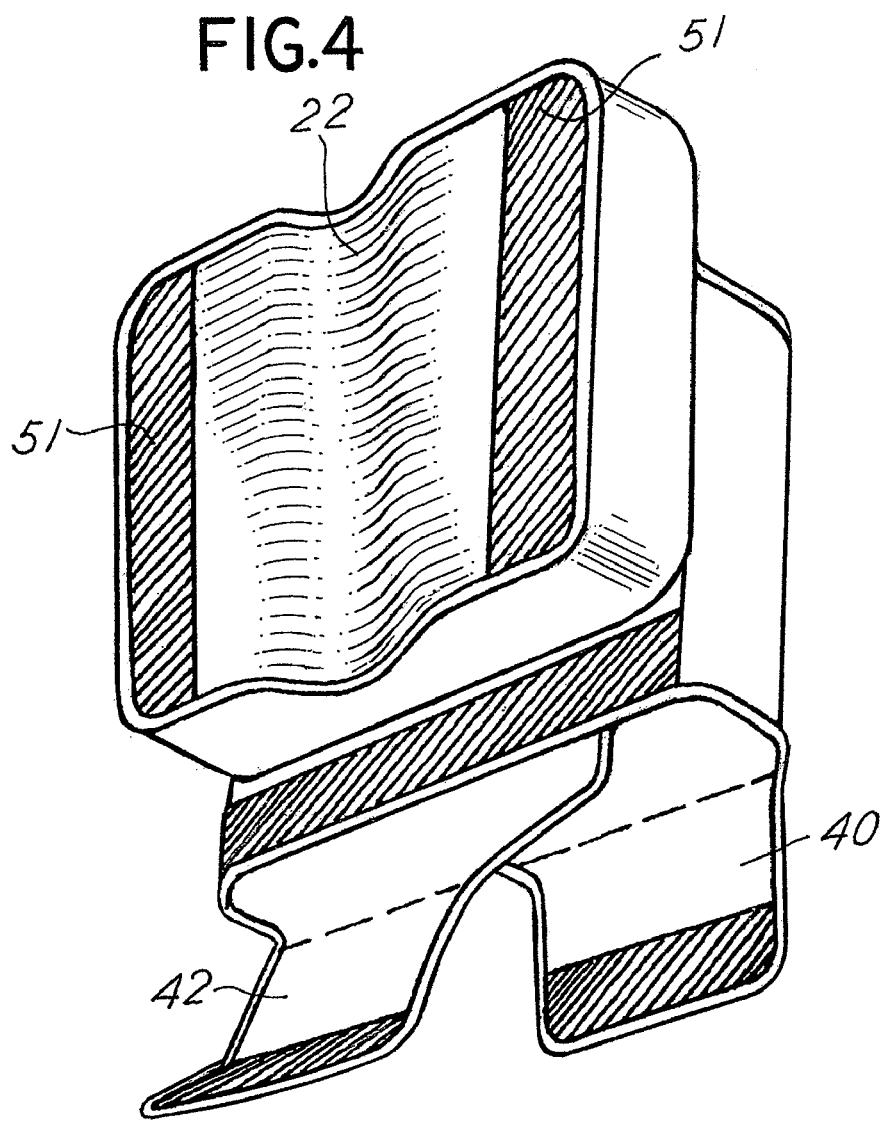
FIG. 4 is an isometric view of the back side of the case of FIG. 3.
Figure 5:
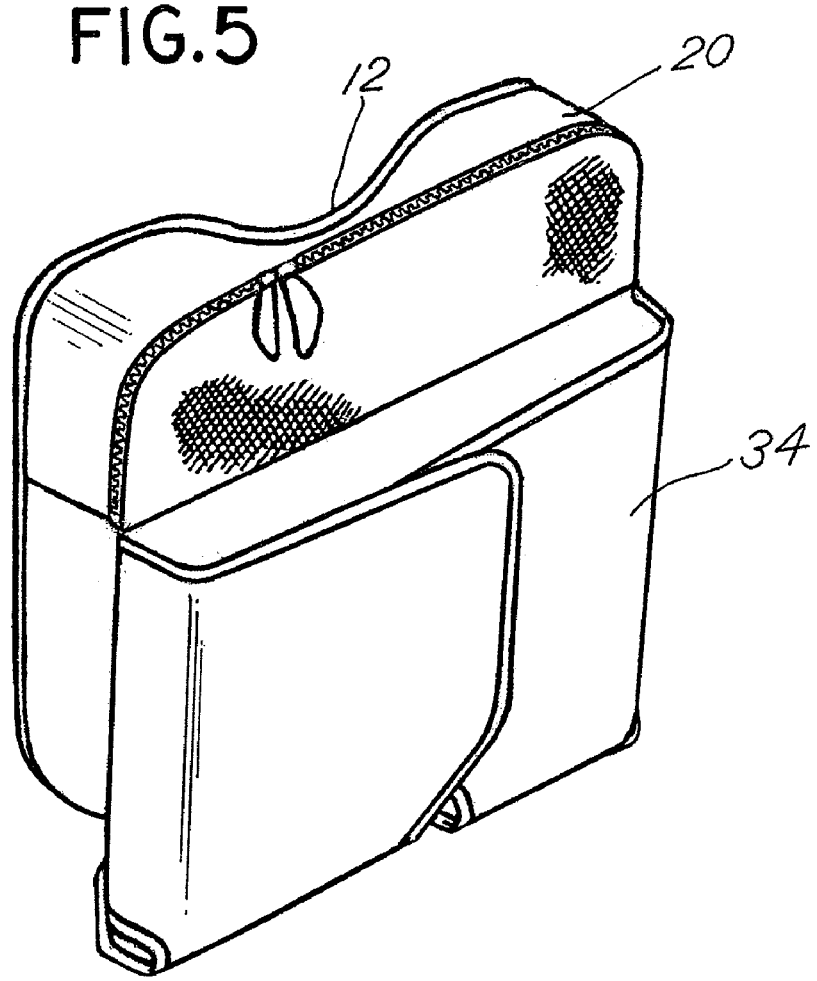
FIG. 5 is an isometric view of the case of FIG. 1 in a fully folded position with a pocket formed to receive an item.
Figure 6:
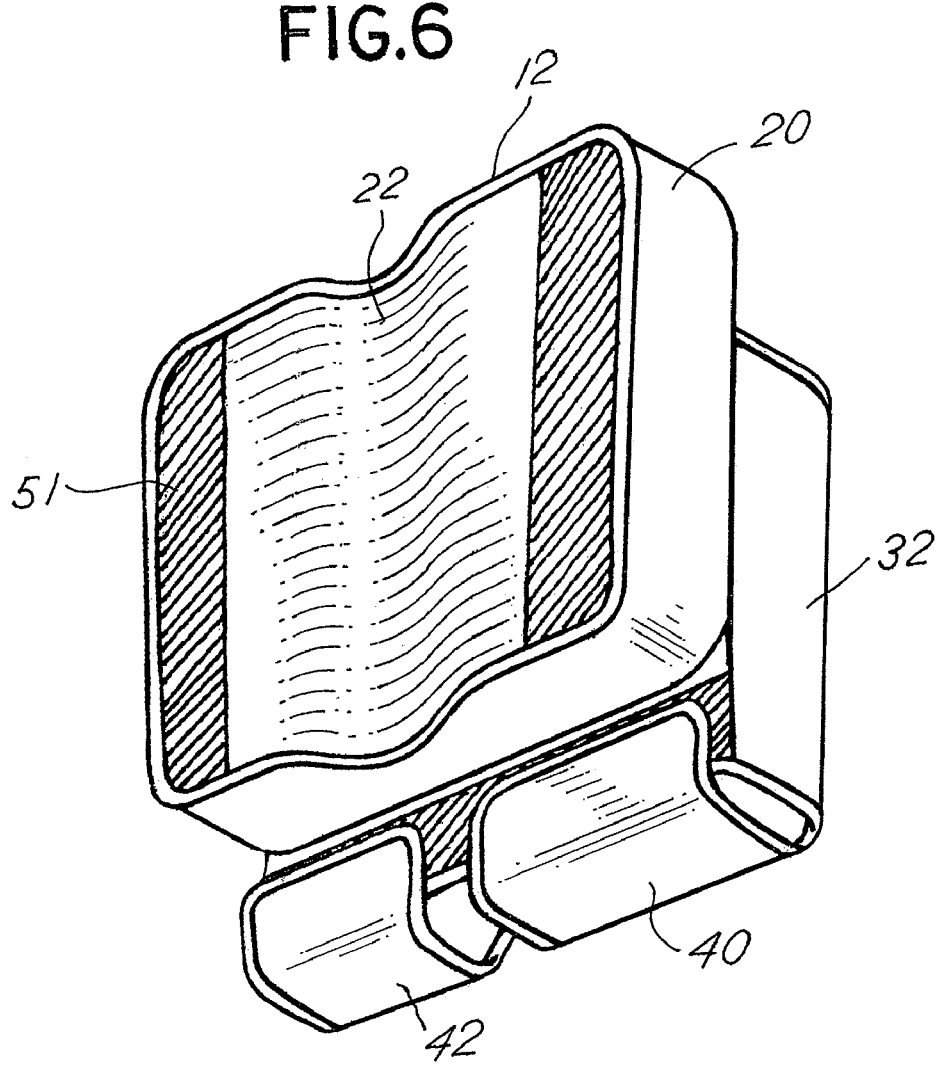
FIG. 6 is an isometric view of the back side of the case of FIG. 5.
Figure 7:
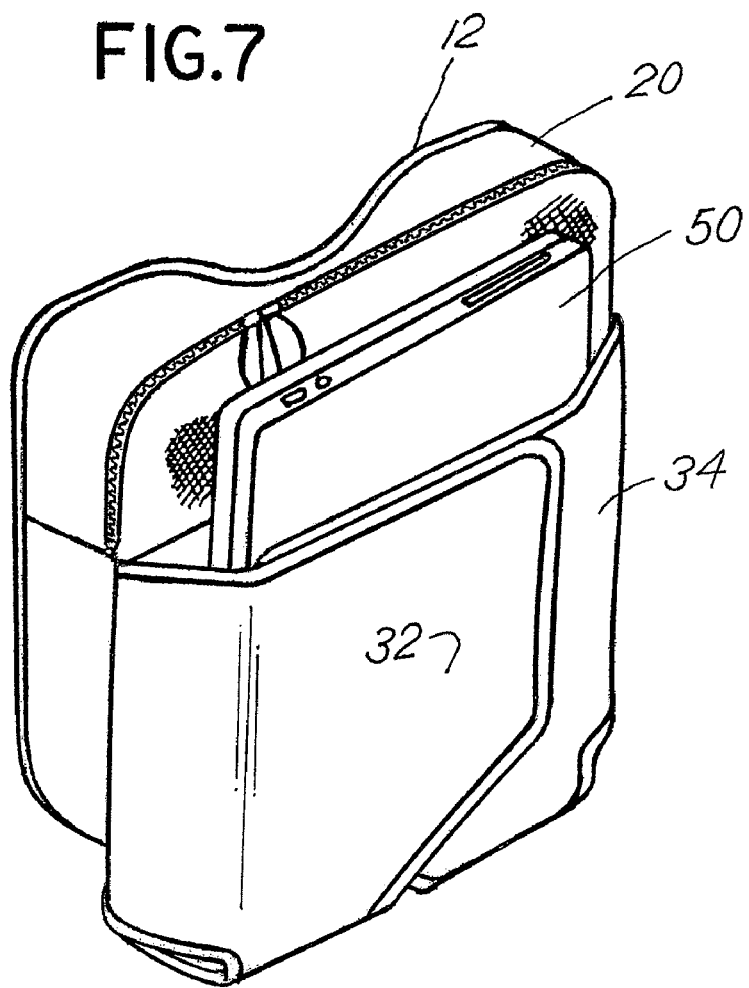
FIG. 7 is an isometric view of the case of FIG. 1 with a laptop computer having a small or first size stored therein.
Figure 8:
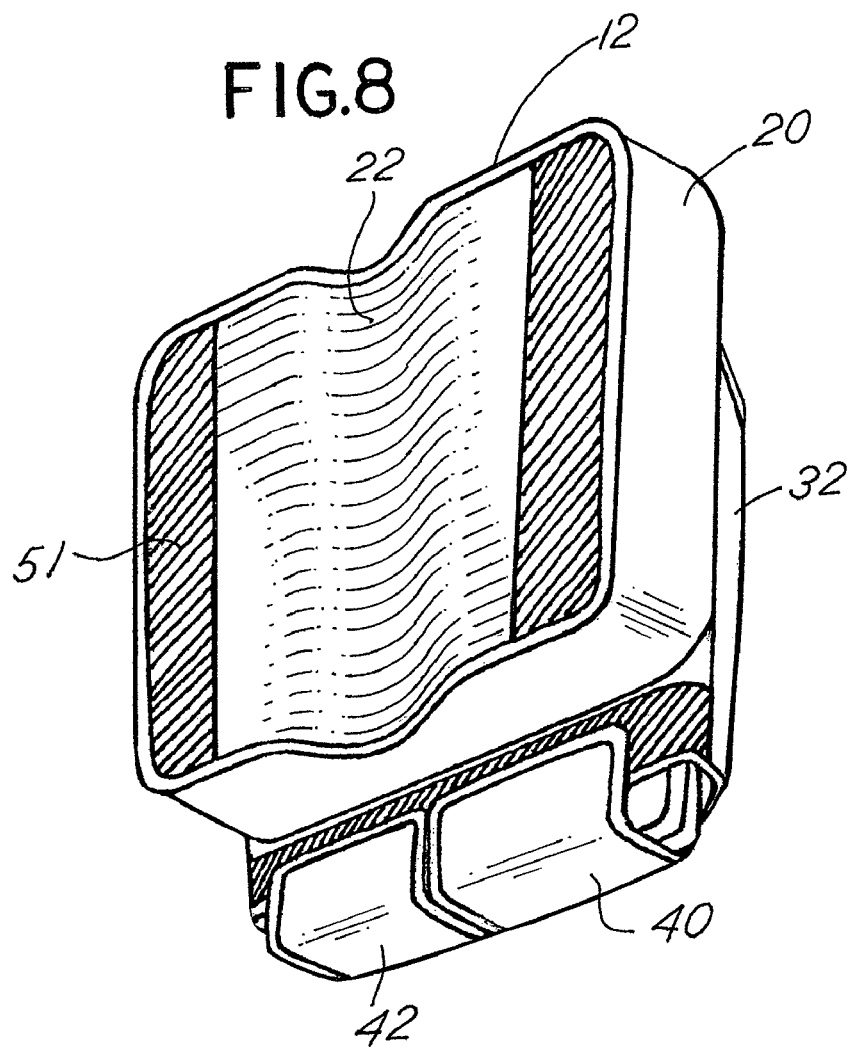
FIG. 8 is an isometric view of the back side of the case of FIG. 7.
Figure 9:
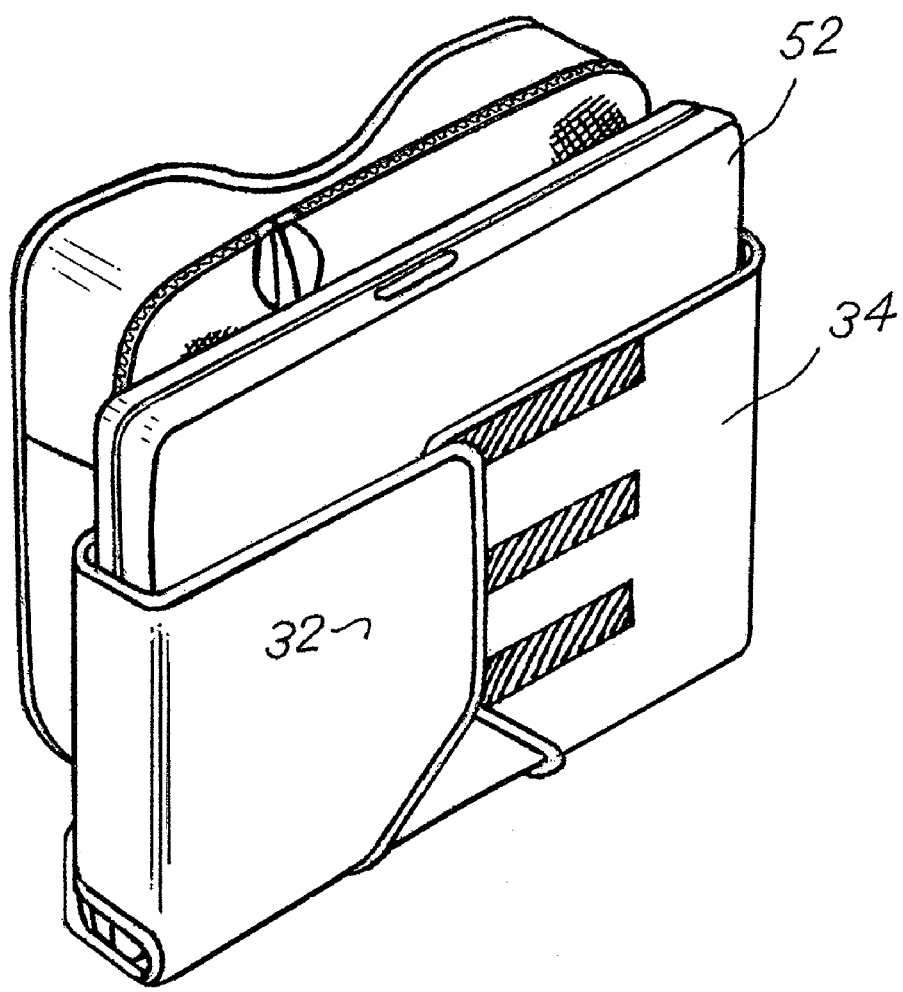
FIG. 9 is an isometric view of the case of FIG. 1 with a large laptop computer or item stored therein.
Figure 10:
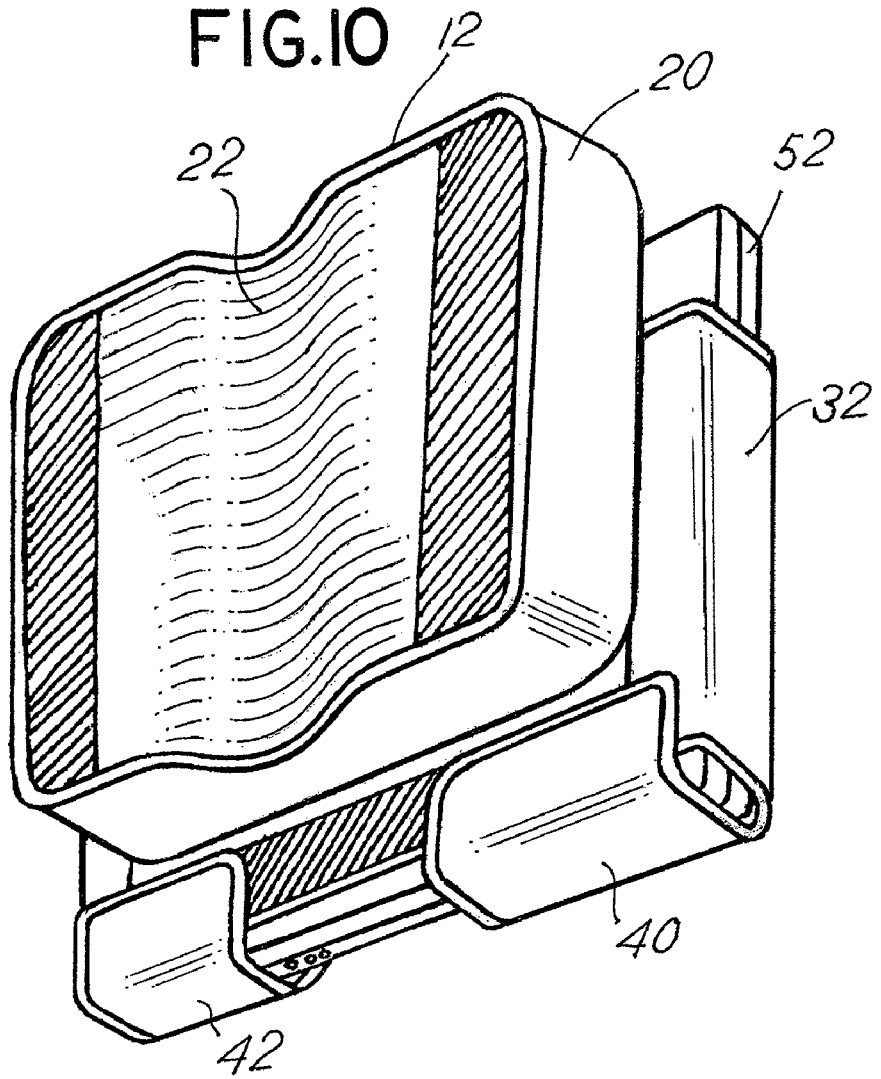
FIG. 10 is an isometric view of the back side of the case of FIG. 9.

FIGS. 3 and 4 illustrate the manner of folding the side or lateral panels 32 and 34. The panels 32 and 34 may be folded one over the other as depicted to form a pocket. The bottom flaps 40 and 42 may similarly be folded as illustrated in FIGS. 3 and 4. The bottom flaps 40 and 42 may be further folded as depicted in FIGS. 5 and 6 to define an enclosure which is sized to accommodate a desired item. That is, because of the hook and loop fastening mechanisms which are employed, the size of the pocket defined by the various sections and flaps may be adjusted. FIG. 7, for example, illustrates this adjustment feature since the sections 32 and 34 are folded tightly over one another to enclose a laptop computer 50 having a generally smaller size relative to the items depicted in FIGS. 9 and 10 wherein a larger size laptop computer or item 52 is retained by the folded flaps and sections 32, 34, 40 and 42. FIG. 10, as well as FIG. 9 therefore, illustrates the manner in which a larger item 52 is retained.

Figure 11:
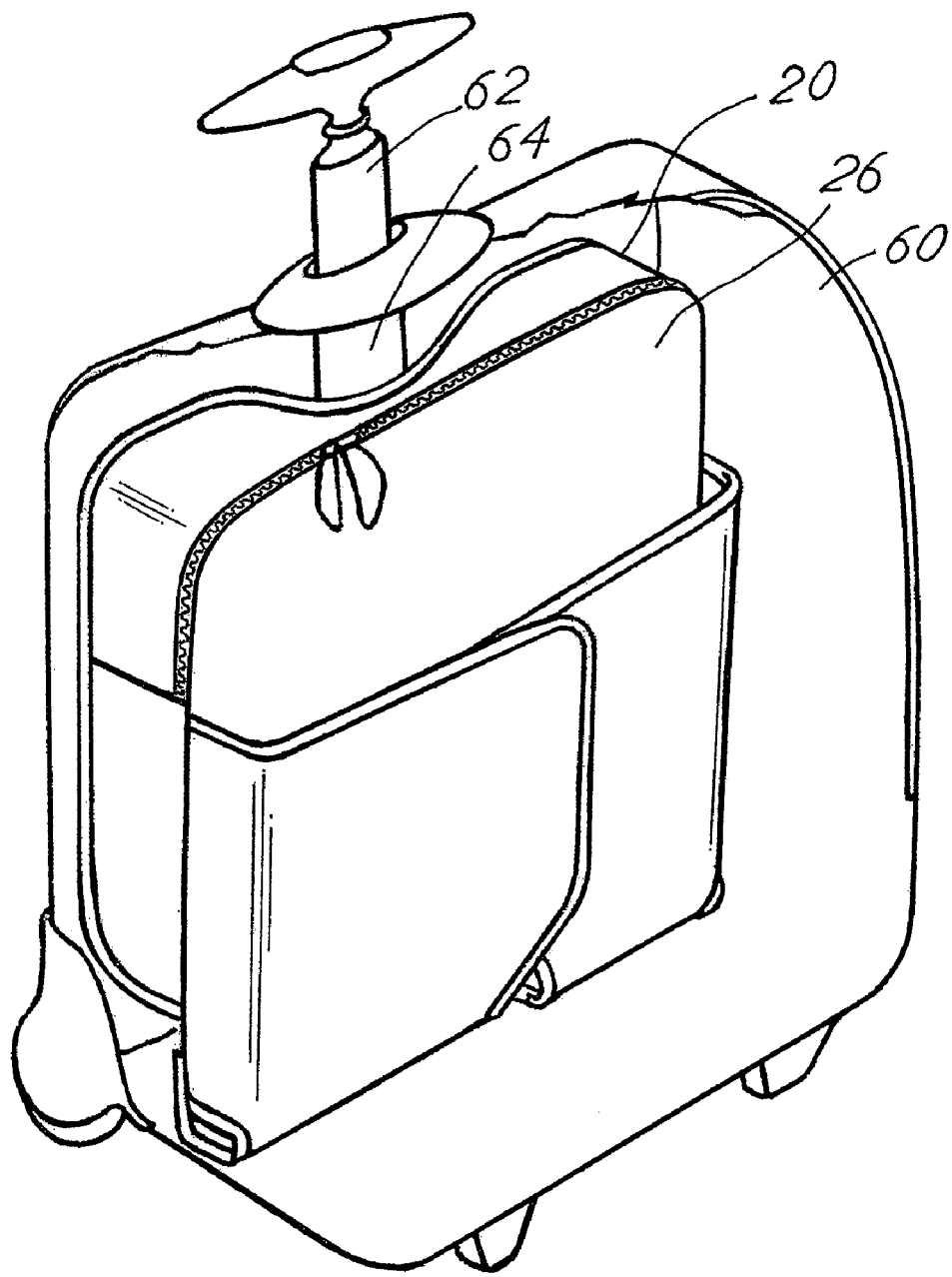
FIG. 11 is an isometric view of the storage case of FIG. 1 folded and then positioned in a wheeled luggage item having an internally mounted, telescoping handle assembly.
Figure 12:
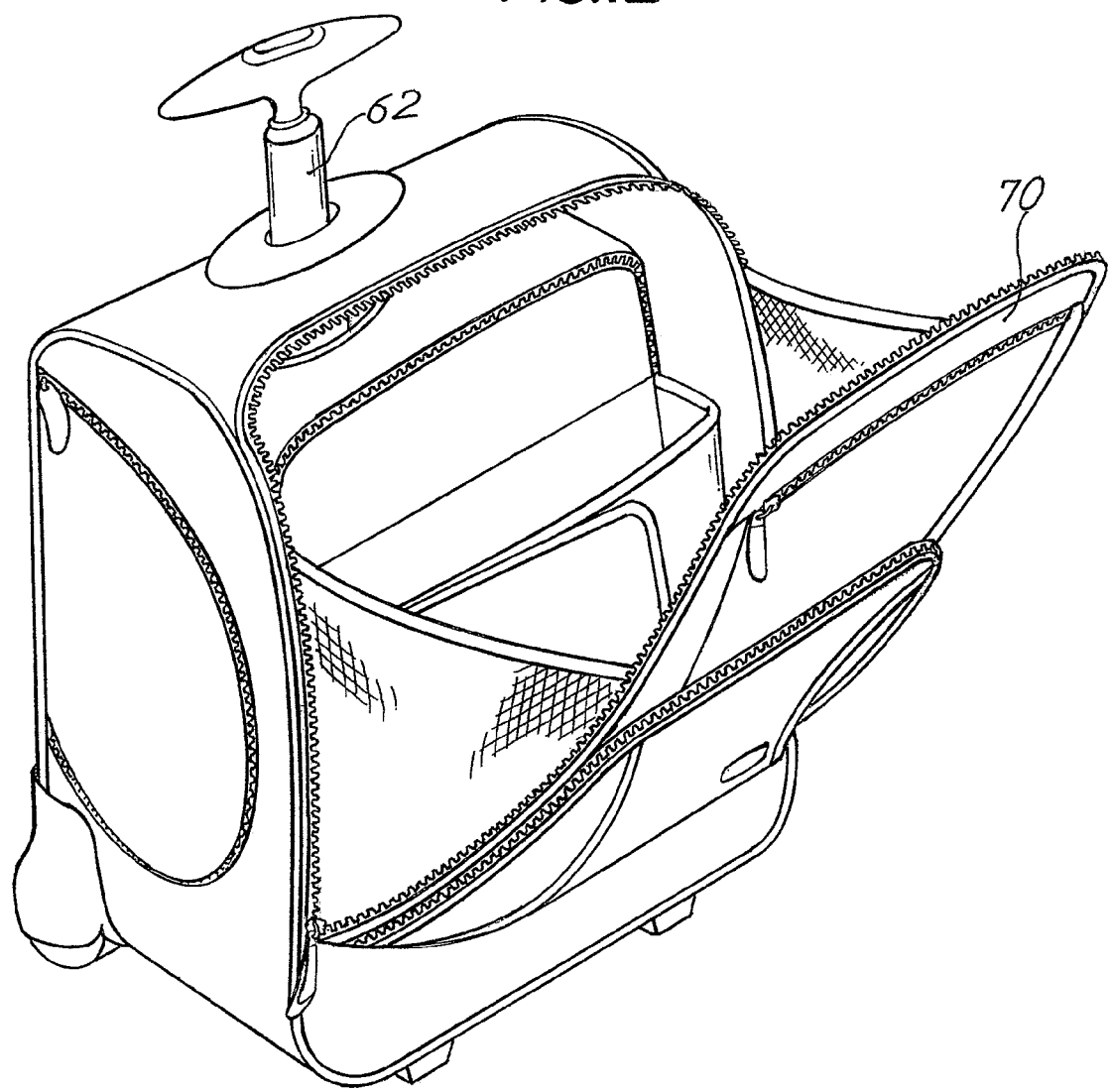
FIG. 12 is an isometric view of the assembly of FIG. 11 wherein the luggage is depicted with an open front flap with the storage case of the invention inserted therein.
Figure 13:
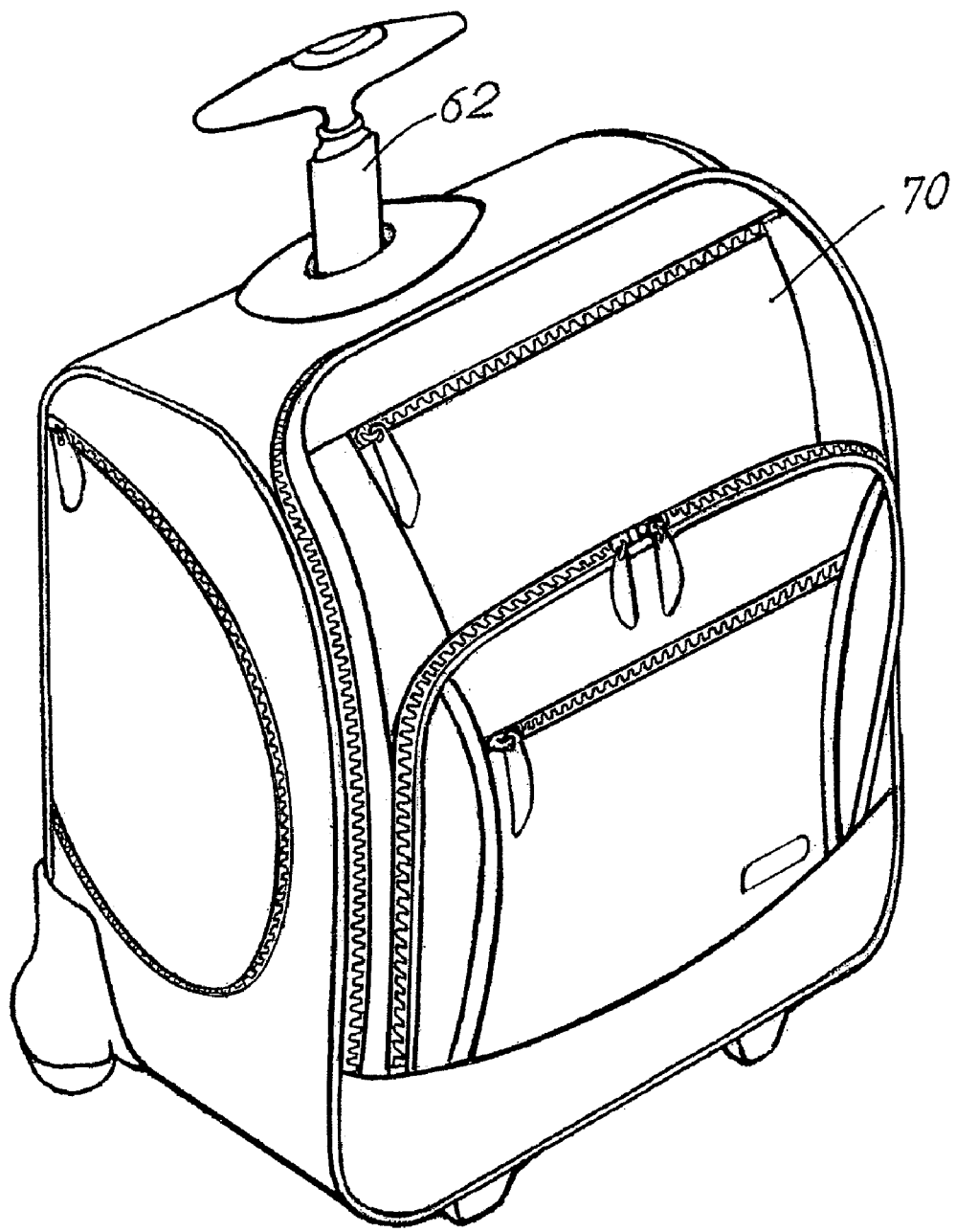
FIG. 13 is an isometric view of the luggage item of FIG. 12 in the closed condition.

FIGS. 11-13 illustrate how the carrying case or assembly in the previously described figures may be fitted into wheeled luggage, having a handle that telescopes. FIG. 11 depicts a cutaway view of a wheeled luggage item 60 including a telescoping handle 62 with a central, interior storage tube for storage of the handle 62. The case 10 is defined by the front side or panel 16 and back side or panel 18, as well as lateral side or panel 20, and the recess 22 in front side 16 to fit around the telescoping handle assembly 64. The hook and loop fasteners 51 associated with the front side 16 may then hold or retain the case 10 as well as an item in the folded section thereof in the luggage as depicted, for example, in FIG. 12. The luggage may thus include a front flap 70 depicted in FIG. 13 which may be positioned in the closed position. The assembly insures that all of the items will be retained snuggly within the wheeled luggage item 60 and not damaged. The flaps 40, 42 which link to sections 32, 34 may be padded to further enhance the protection of the item. Likewise, the walls of the case such as the front wall or front side 16, back side 18 and lateral side wall 20 may also be padded to further enhance protection of items retained and stored by the assembly.

Various combinations and permutations of the elements disclosed and described may be utilized without departing from the spirit and scope of the invention. The invention is therefore to be limited only by the following claims and equivalents thereof.

What is claimed is:

1. A laptop computer case comprising, in combination:
    a first storage case section including a front side with a top edge and a bottom edge, a generally flat planar back side, and a circumferential lateral side connecting the front side and back side to form a storage enclosure for a first item, said front side including a recessed central section extending generally from the top edge to the bottom edge; and
    first and second panel sections attached to the back side, said first and second sections foldable over the back side to accommodate a second item upon folding of said sections about the second item positioned over the back side, said back side including a generally center section with a first side boundary and a second opposite side boundary, said first and second panel sections including, respectively, a first lateral side section attached to the first side panel section and a second lateral side section attached to the second side panel section, said first panel section having a first bottom flap, said first and second side sections foldable over the center section, and the first bottom flap foldable over said back side to provide a storage pocket open in the direction of the top edge for receiving said second item.

2. The case of claim 1 further including a second bottom flap on the second panel section, said second bottom flap foldable over said back side.

3. The case of claim 2 including fasteners for connecting the first and second flaps to the center section.

4. The case of claim 1 in combination with travel luggage having an internal, telescoping handle assembly, said recessed central section of the first storage case fitted over the handle assembly.

5. The case of claim 1 including an access opening in the back side to the first storage case section.

6. The case of claim 1 including fasteners for connecting said first and second foldable panel sections.

7. The case of claim 1 including hook and loop fasteners for connecting said first and second foldable panel sections.

8. The case of claim 1 including fasteners for connecting the first bottom flap to the center section.

9. The case of claim 1 wherein said back side is comprised of a generally rigid center section and said first and second panel sections are generally flexible.

* * * * *